Nov. 4, 1941.  J. HERTRICH  2,261,914
CENTRIFUGAL CONTROL APPARATUS
Filed Nov. 2, 1938   6 Sheets-Sheet 1
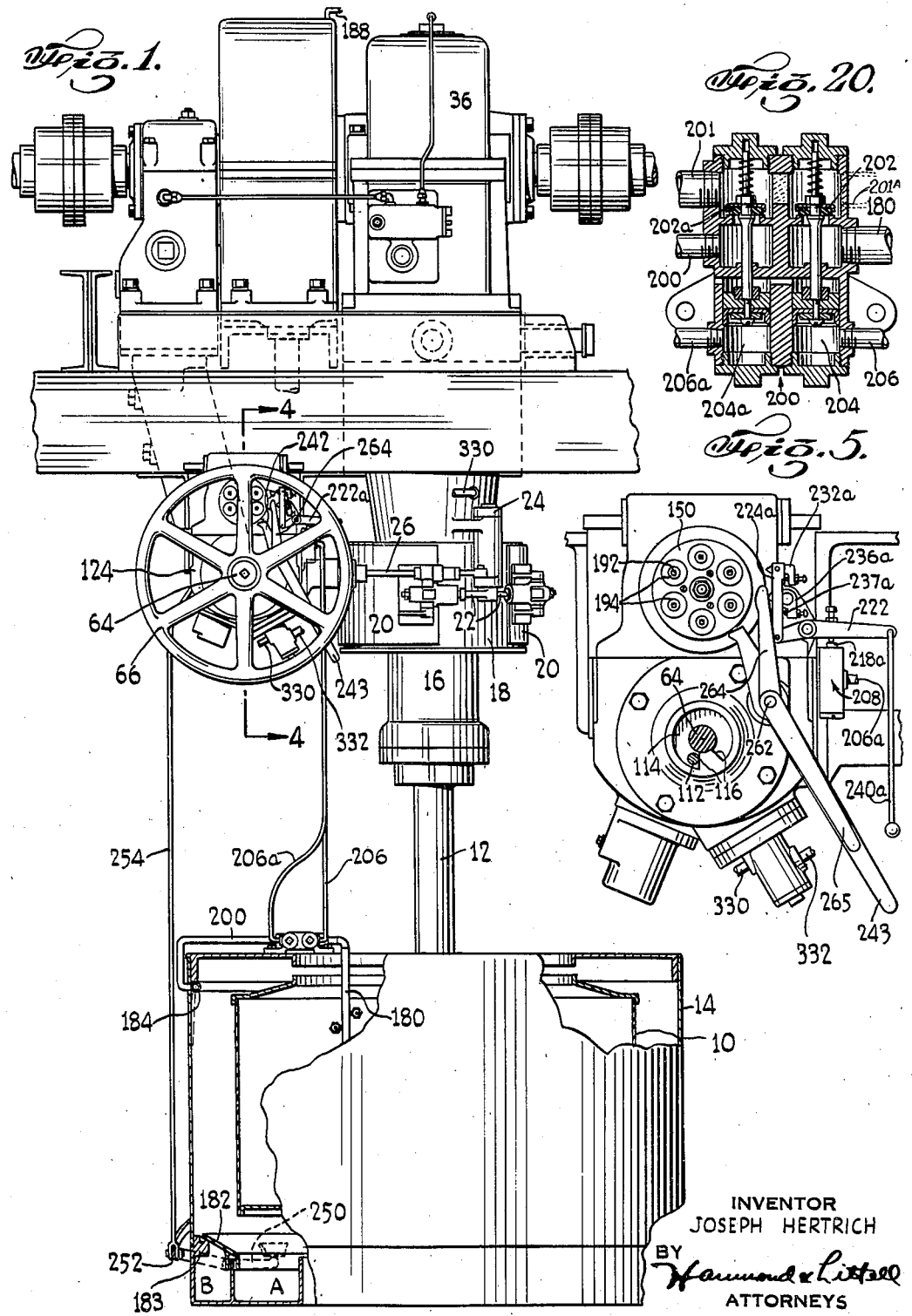
INVENTOR
JOSEPH HERTRICH
BY
Hammond & Littell
ATTORNEYS

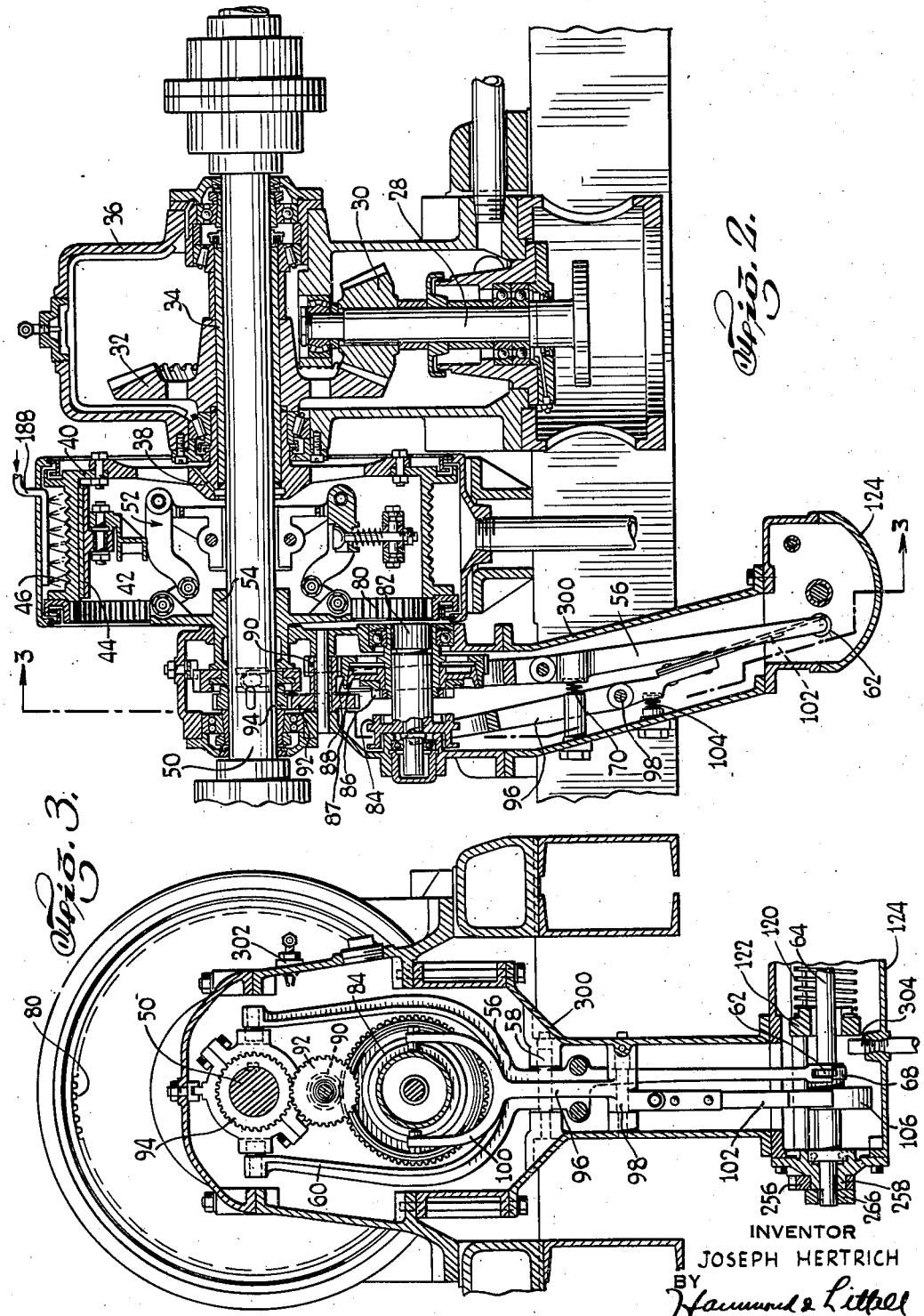

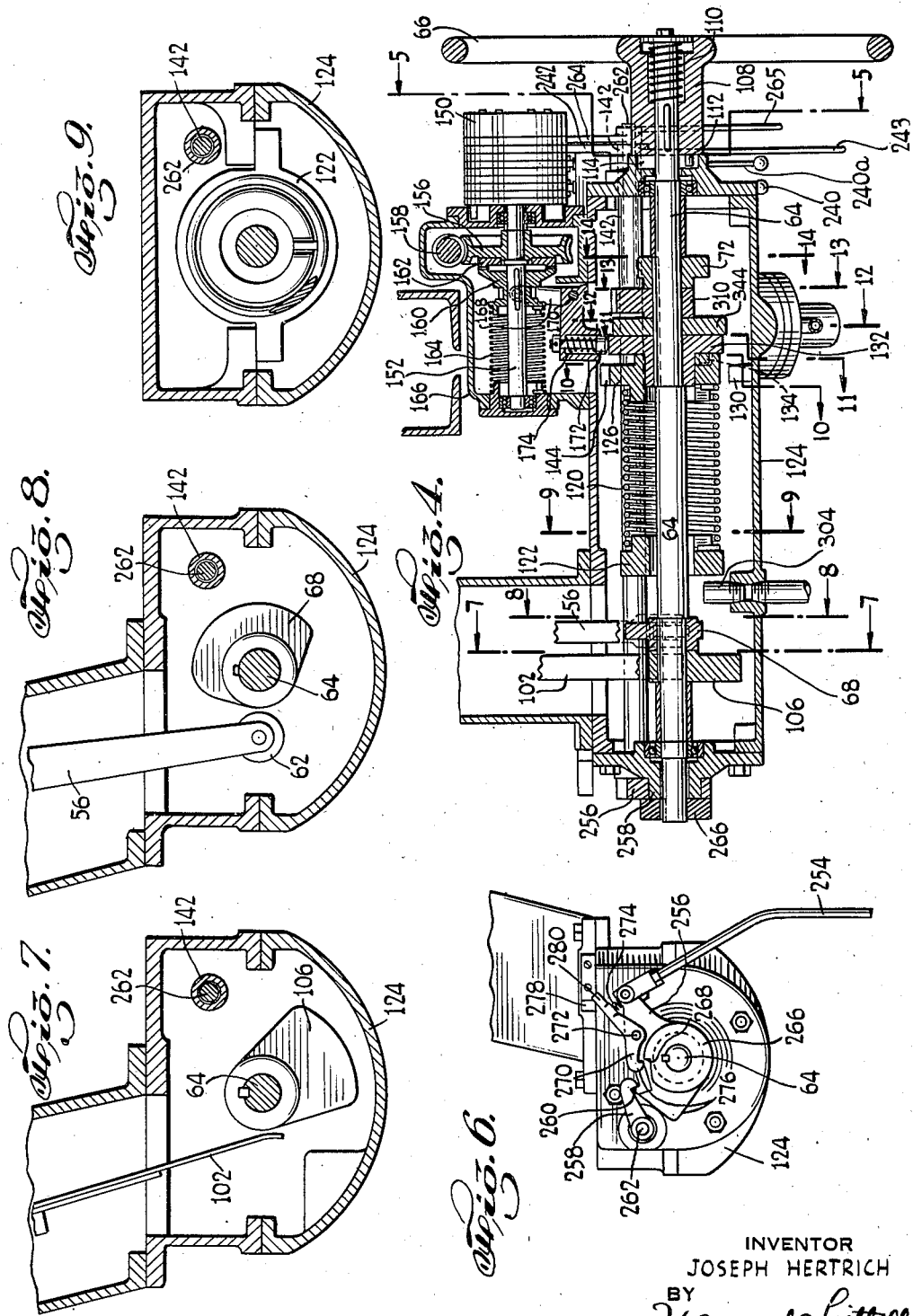

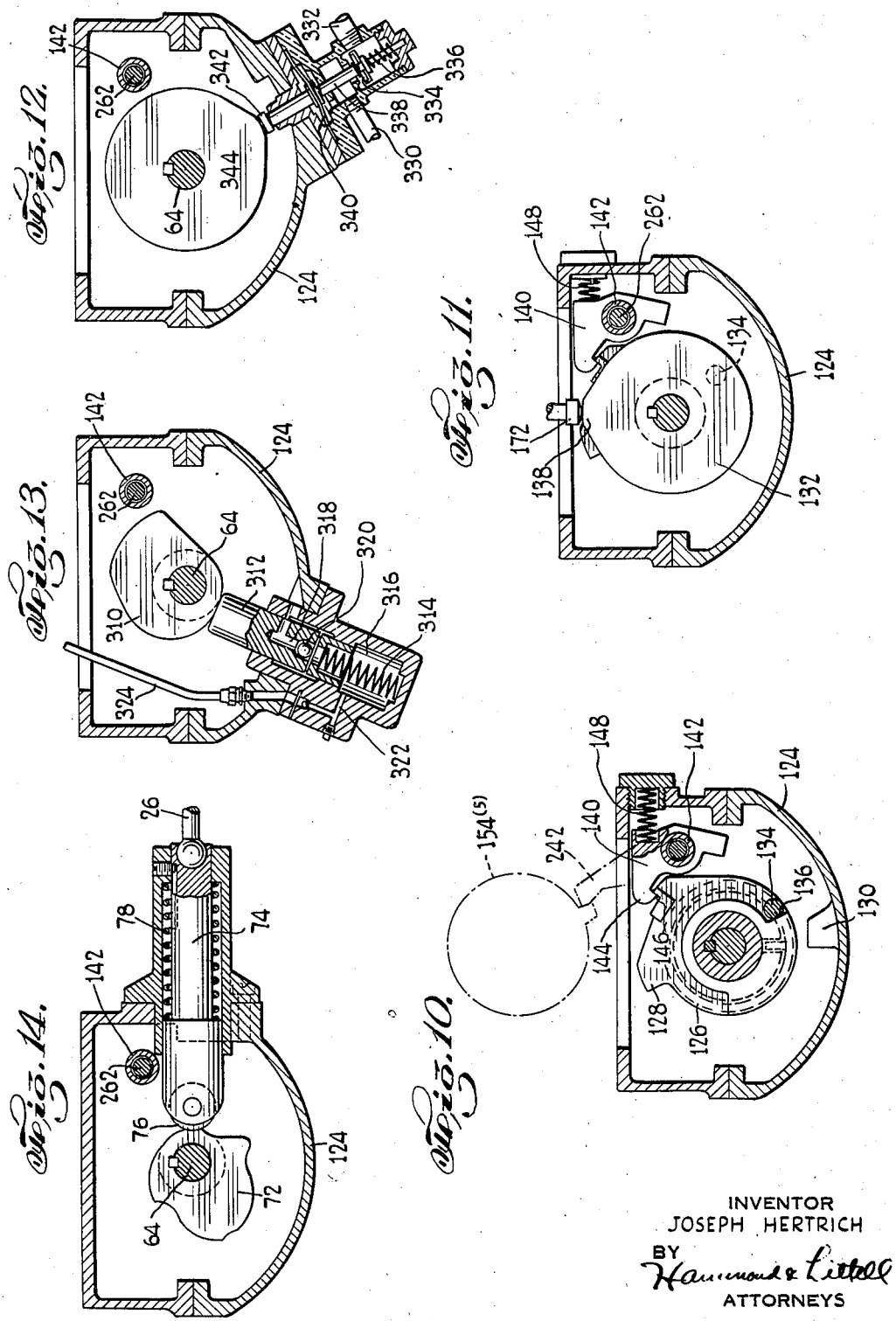

Nov. 4, 1941.   J. HERTRICH   2,261,914
CENTRIFUGAL CONTROL APPARATUS
Filed Nov. 2, 1938   6 Sheets-Sheet 5
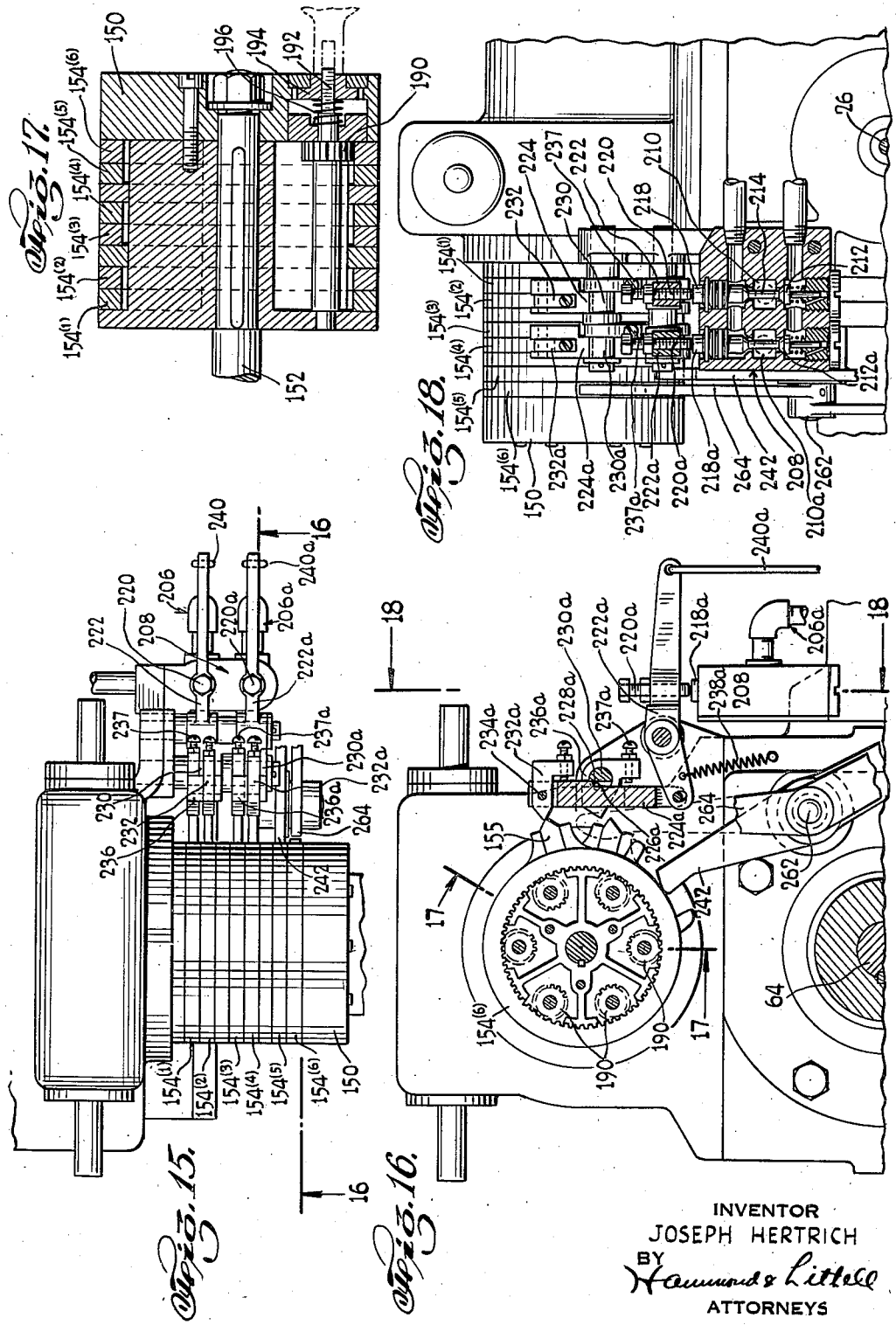
INVENTOR
JOSEPH HERTRICH
BY
Hammond & Littell
ATTORNEYS Nov. 4, 1941.  J. HERTRICH  2,261,914
CENTRIFUGAL CONTROL APPARATUS
Filed Nov. 2, 1938  6 Sheets-Sheet 6
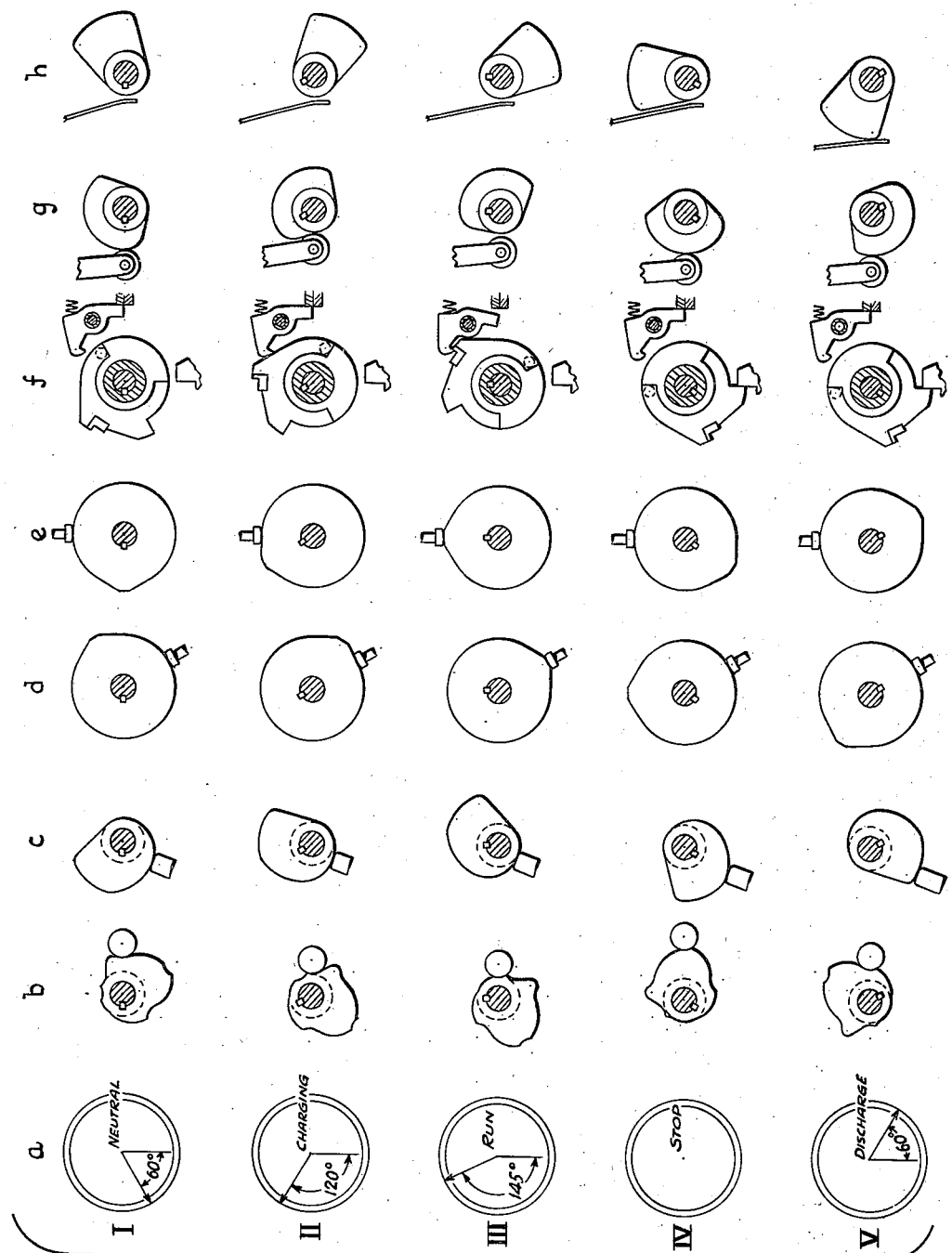
INVENTOR
JOSEPH HERTRICH
BY Hammond & Littell
ATTORNEYS Patented Nov. 4, 1941

2,261,914

UNITED STATES PATENT OFFICE 2,261,914

CENTRIFUGAL CONTROL APPARATUS

Joseph Hertrich, Hamilton, Ohio, assignor to The Western States Machine Company, New York, N. Y., a corporation of Utah Application November 2, 1938, Serial No. 238,389

19 Claims. (Cl. 210—71)

This invention relates to new and useful improvements in centrifugal control apparatus, particularly for use with suspended gyratory centrifugals of the types employed for the extraction of liquids from solids, as in the manufacture of sugar.

In recent years, centrifugal apparatus of this type has been improved in important respects to provide more efficient driving and control mechanisms for accurately controlling and timing the several operations of the centrifuging cycle, as in the treatment of materials such as mixtures of sugar crystals and syrup. Apparatus of this type has been developed by Eugene Roberts by which the operations of purging liquids from solids, washing the solids, separating liquids expelled from the solids, retarding revolution of the centrifugals, and discharging treated solids from the centrifugal baskets may be carried out efficiently and with important processing advantages as compared with earlier apparatus.

The present invention provides certain modifications and improvements of well known types of centrifugal apparatus heretofore developed by Eugene Roberts, although the utility of many features hereof is not restricted but extends also to other types of centrifugals using other forms of driving and controlling mechanisms.

Among the objects of this invention are to provide centrifugal control apparatus characterized by improved compactness of construction and flexibility of operation; to provide mechanical control apparatus in which most of the running parts are enclosed and perfectly lubricated; to eliminate rapid movements and shocks on the control mechanisms; to provide apparatus in which mechanical controls for actuating the driving and braking units of the centrifugal are coordinated in operation but are independently adjustable; to provide mechanical controls for automatic and timed operation, including a single manually-operable member by which the brake unit may be rendered operative manually and independent of spring-actuated mechanism for applying the brake automatically; to provide such controls whereby an auxiliary driving means for driving the centrifugal is rendered operative by movement of said member in an exclusive path independent of said spring-actuated mechanism; and with the above mentioned and other features to retain all of the desirable characteristics of apparatus such as disclosed in the aforesaid Roberts application.

The invention consists in novel arrangements, constructions and combinations of apparatus which are disclosed with respect to an illustrative embodiment in the following description and are set forth particularly in the claims appended hereto.

The apparatus in general comprises any usual centrifugal basket suspended on a gyratory spindle to revolve inside a casing or curb when driving power is transmitted to the spindle, together with driving means for the spindle and braking means for retarding revolution thereof, of any suitable construction. The apparatus further comprises control mechanism for actuating said driving means to start a cycle of operation of the centrifugal, a sprayer for applying washing liquid to contents of the centrifugal during the cycle, a syrup-separator for separating different portions of liquid flowing from the centrifugal curb at different time intervals during the cycle, flushing means for cleaning or hastening the flow of liquids from the curb wall from time to time, means for admitting cooling liquid to the brake, and actuating and control mechanisms for actuating said sprayer, syrup-separator, flushing means, cooling means and braking means in desired coordination during each cycle. Said actuating mechanisms include automatically operated timing means for actuating the sprayer, syrup-separator, flushing means and braking means at predetermined and variable intervals during each centrifuging cycle, as may be desired in the processing of the particular type of material undergoing treatment. In addition, the apparatus preferably includes an auxiliary driving means for driving the centrifugal at a low speed during the discharging of its treated contents, or during the loading period, together with mechanism for actuating and controlling the auxiliary driving means. The entire control apparatus is constructed and arranged so that neither the main driving means nor the auxiliary driving means can be operative when the other is operative, and so that the braking means cannot be operative when either of the driving means is operative. The actuation of the control apparatus embodying all of these features normally takes place by simple movement of a single manually operable member that is arranged within convenient reach of the attendant of the centrifugal.

A special feature of this invention resides in the provision, in a combination such as described above, of a control shaft that is movable manually to actuate in proper and predetermined coordination the actuating mechanisms for the several functional elements of the centrifugal, but without mechanical interconnection between the principal actuating mechanisms. To this end, the control shaft is provided with a plurality of control cams, one for each of the principal actuating mechanisms, which are formed and arranged on the control shaft so that in any position of the shaft a proper relationship between the functional elements of the centrifugal is ensured. Thus the adjustment of each actuating mechanism, particularly of the mechanisms for actuating the main driving means and the brake, may take place independently of the others, and the simplicity and flexibility of the apparatus are improved in important respects.

Another feature of the invention lies in the provision of dampening means for retarding or dampening the movement of the control shaft and actuating mechanisms when moving under the influence of a control spring that is employed in normal operation of the apparatus for automatic application of the brake and for releasing the main driving means, thereby eliminating objectionable shocks on the apparatus.

As another feature of the invention, the control shaft, the manually operable control member thereon and the control cams are constructed and arranged so that the actuation of the auxiliary driving means, when used, occurs in one field of movement of these controls, while the actuation of the other elements of the centrifugal occurs in a different field or fields of movement thereof. In this way the operation of the apparatus is simplified, and there is less likelihood of inadvertent operation by an inexperienced or careless attendant. In addition, an improved arrangement of auxiliary driving means in combination with main driving means is provided, and the actuating mechanism for the former is constructed so that difficulties in engaging the same are avoided.

Further features of the invention reside in the provision of a control position in which the main driving means may be temporarily operative while the timing means and the brake or clutch cooling means remain inoperative, and in the novel construction and arrangement of the timing means relative to the controls such that the adjustment and operation of the timer are simplified. All of these features, and many others which will be apparent from the following description, may be embodied in an apparatus that is more compact, better protected against damage or mis-adjustment, and superior in operation and appearance to prior apparatus of similar type.

An illustrative construction of apparatus embodying this invention is shown in the accompanying drawings, in which Figure 1 is a front elevation of a complete centrifugal machine including the improved control apparatus and showing the centrifugal curb and basket partly in section.

Figure 2 is a vertical section through the main and auxiliary driving means for the centrifugal, including parts of the actuating mechanisms therefor.

Figure 3 is a vertical section taken approximately on the line 3—3 of Figure 2.

Figure 4 is a vertical section along line 4—4 of Figure 1, showing control means for the centrifugal.

Figure 5 is a front elevation, partly in section, along line 5—5 of Figure 4, showing the control housing, the timer head, and parts actuated by the timer.

Figure 6 is a rear elevation of the control housing, revealing parts of the actuating mechanism for the syrup separator.

Figure 7 is a vertical section along the line 7—7 of Figure 4, showing the control cam for the auxiliary driving means.

Figure 8 is a vertical section along the line 8—8 of Figure 4, showing the control cam for the main driving means.

Figure 9 is a vertical section along the line 9—9 of Figure 4, showing the bridge support for the control spring.

Figures 10, 11, 12, 13 and 14 are vertical sections along the correspondingly numbered section lines of Figure 4, showing the control cams for the control spring, the timing means, the brake cooling means, the dampening means, and the braking means, respectively.

Figure 15 is a plan view of the timer head and of certain parts actuated thereby.

Figure 16 is a vertical section along the line 16—16 of Figure 15.

Figure 17 is a cross-section along the line 17—17 of Figure 16, showing details of construction of the timer head.

Figure 18 is a side view, partly in section, along line 18—18 of Figure 16.

Figure 19 is a diagrammatic illustration showing the condition of the several control cams in each of the several possible positions that may be occupied by the control apparatus.

Figure 20 is a sectional view showing the construction of special valves for the sprayer and curb wash pipe.

Referring to the drawings for details of an illustrative embodiment of the invention, the apparatus there illustrated comprises a centrifugal basket 10 suspended on a gyratory spindle 12 to revolve inside a surrounding curb or casing 14. The spindle 12 is mounted for revolution and swaying motion in a suitable driving head 16, the details of which are not shown since such heads are well known in the art. Braking means are provided for retarding revolution of the spindle and basket, the braking means in the illustrative embodiment comprising a drum 18 fixed to the basket spindle, external brake bands 20 and brake actuating mechanism including links 22 connected with a rocker pin 24 which, in turn, is connected with actuating linkage 26 in such manner that linear movement of link 26 either contracts the brake bands against drum 18 or frees them from contact with the drum.

Main driving means are provided for revolving the centrifugal at high speeds during the purging of materials located in the basket 10. As shown in Figure 2, a vertical transmission shaft 28 is provided for connection at one end with a driving head for the spindle and at the other end with a bevel gear pinion 30. Pinion 30 meshes with a bevel gear 32 fastened to a rotatable driving member 34 that extends horizontally to a point outside of casing 36. The casing encloses the gear elements and holds the gear elements, member 34 and shaft 28 in precise arrangement as a unitary driving unit. The driving member 34 and the vertical transmission shaft 28 are both mounted in anti-friction bearings, for example as illustrated in Figure 2. The end of member 34 which extends from casing 36 is securely fastened to a hub portion 38 of a rotatable friction drum 40, presenting an inner friction surface 42 for cooperation with friction clutch pads 44 and an outer surface 42 for cooperation with friction clutch pads 44 and an outer surface 46 for reception of a drum-cooling spray during the operation of the machine. A liquid inlet system for directing a cooling spray onto surface 46 is indicated at 188 in Figure 1.

A constantly revolving line shaft 50 is arranged axially with respect to the friction drum 40 and carries thereon supporting mechanism 52 for the clutch pads 44, said mechanism being constructed to permit movement of the clutch pads into and out of frictional engagement with surface 42 of the drum. The supporting mechanism 52 and the clutch pads 44 revolve with shaft 50, and when the mechanism is in a position such that the pads contact the drum the former are held in engagement with the drum by centrifugal force and thus result in movement of the drum with shaft 50. Such movement is transmitted through member 34, gears 32 and 30, shaft 28 and driving head 16 to the spindle 12 and the centrifugal basket 10 suspended thereon.

The actuating mechanism for the main driving means above described is illustrated in Figures 2 and 3. A collar 54 is keyed to shaft 50 in a manner permitting movement of the collar axially with respect to the shaft. Collar 54 is connected with the supporting mechanism 52 so that it holds the clutch pads 44 away from drum 40 when in a position nearest the drum and permits the pads to be forced into contact with the drum when in a position away from the drum. An actuating lever 56, fulcrumed intermediate its ends as at 58, carries at one end a fork 60 connected with collar 54 so that movement of the lever around its fulcrum results in shifting of the collar and of the clutching mechanism to and from their operative positions. The lower end portion of lever 56 carries a roller 62 for cooperation with control mechanism hereinafter described.

According to the present invention, a new arrangement and construction of control means is provided for governing the positions of the actuating mechanisms for the main driving means and the braking means. Heretofore, both of these actuating mechanisms have been interconnected mechanically with a control shaft, and because of such interconnection changes in the position of the clutch mechanism relative to the clutch drum 40, for example, have resulted in corresponding changes in the setting of the brake. Since the clutch pads are subject to intense wear during operation of the machine, considerable trouble has been encountered in maintaining adjustments of the driving and braking means which would ensure optimum and uniform operation of the machine.

According to the present construction, the control means is arranged so that the actuating mechanisms for the main driving means and the brake are free of mechanical interconnection, but at the same time are coordinated so as to secure proper and safe operation during the processing of materials with the centrifugal. A control shaft 64 is arranged to extend forwardly to a position convenient to an attendant of the apparatus and to extend backwardly to a position for cooperation with actuating mechanisms for the several functional elements of the apparatus. A manually movable hand wheel 66 is keyed to the forward end of the control shaft so that turning movement of the hand wheel results in rotation of the control shaft. Adjacent the roller 62 on lever 56, the control shaft carries a control cam 68 for governing the positions of the main driving means. A spring 70 cooperates with lever 56 and normally tends to hold the same in a position in which the clutch pads 44 are in operative engagement with the clutch drum 40. When shaft 64 is rotated by hand wheel 66 to a position such that the high part of cam 68 engages and moves roller 62, the lever 56 and other parts of the actuating mechanism for the driving means are shifted to a position retracting the clutch pads 44 from engagement with drum 40.

Nearer its forward end the control shaft carries a control cam 72 (see Figure 14) for governing the positions of the braking means. Link 26 of the brake actuating mechanism is connected with a sliding block 74, to an end of which is secured a cam roller 76 cooperating with cam 72. A spring 78 holds roller 76 in contact with cam 72 and thus keeps the brake bands 20 in an inoperative position when the low parts of cam 72 permit roller 76 to lie close to the control shaft. When the shaft is turned so that the high parts of cam 72 engage roller 76, the actuating mechanism for the braking means is moved to a position in which the brake is operative.

By comparison of Figures 8 and 14, it will be observed that the main driving means is operative and the brake is inoperative when the control elements rest in the positions illustrated in these figures. It will also be observed that when shaft 64 is turned to engage cam 68 with roller 62 and move the main driving means to inoperative position, the braking means is thereupon moved to operative position.

In conjunction with the foregoing, the apparatus may be provided with auxiliary driving means for driving the centrifugal at reduced speeds in order to facilitate the discharging of solid materials from the basket 10, or to provide for a constant loading speed. This auxiliary driving means is arranged in combination with the main driving means so that both are driven from shaft 50 and so that both are controlled by control shaft 64 in an improved manner.

A preferred form of the auxiliary driving means is illustrated in Figures 2 and 3. In this form the friction drum 40 carries an inwardly facing ring gear 80 adapted to mesh with an axially shiftable pinion 82. Pinion 82 is connected with a clutch element 84 adapted to engage and couple with a cooperative clutch element 86. The latter is constantly revolved at reduced speed from line shaft 50 by means of a reduction gear train comprising a ring gear 88, pinion 90, gear 92 and gear 94, the latter keyed to shaft 50, there being a conical friction clutch 87, as shown in Figure 2, for transmitting limited torque from gear 88 to clutch element 86 so as to protect against forcing the mechanisms. Clutch element 84 is shiftable axially to engage and disengage pinion 82 with ring gear 80 by means of an actuating lever 96 which is fulcrumed intermediate its ends, as at 98, and comprises a fork or clevis 100 at its upper end and a yieldable end portion 102 at its lower end. A spring 104 (Figure 2) normally holds lever 96, clutch element 84 and pinion 82 in an inoperative position. The yieldable end portion 102 of lever 96 extends downwardly to a position adjacent the control shaft 64, and a control cam 106, keyed to shaft 64, is arranged to cooperate with lever 96 and to govern the positions of the lever and of the auxiliary driving means which it actuates. The relation of the control cam 106 to shaft 64 and end portion 102 is apparent from Figure 7. When the parts lie in the relationship illustrated in Figure 7, the auxiliary driving means is in inoperative position. When the control shaft 64 is turned to engage the top of cam 106 with end portion 102, lever 96 is turned around its fulcrum and pinion 82 and clutch element 84 are moved into engagement with ring gear 80 and clutch element 86, respectively, this movement resulting in rotation of the centrifugal at reduced speed under torque transmitted from shaft 50.

A special feature of the illustrated construction resides in the provision of a yieldable end portion on lever 96. By this means, when the lever is moved to operative position by cam 106 and pinion 82 does not immediately mesh with ring gear 80, the end portion yields without forcing the mechanism but at the same time holds the pinion in a position such that it falls into mesh with the ring gear upon slight movement of the latter.

By reference to Figure 19, which illustrates the several positions of all control cams on shaft 64, and particularly by reference to cams $h$, $g$ and $b$ in the position V of Figure 19, it will be observed that when the high part of cam $h$ (corresponding to cam 106) engages end portion 102, the high part of cam $g$ (corresponding to cam 68) holds the main driving means in inoperative position, and cam $b$ (corresponding to cam 72) requires that the brake be in inoperative position under the influence of spring 78. For reasons to be explained hereinafter, however, ordinary movement of hand wheel 66 in a counter-clockwise direction is not sufficient to place the control shaft and the cams in the V position of Figure 19.

As illustrated in Figures 4 and 5, a hub 108 for the hand wheel 66 is slidably keyed to shaft 64 and normally held in an inward position relative to the shaft by a spring 110. The inner end of hub 108 carries a pin 112 which moves freely in an arcuate passage 114 but is limited in its movement therein by abutments 116. When the hand wheel in normal position under the influence of spring 110, the engagement of pin 112 against abutment 116 prevents the high part of cam 106 from contacting lever 96, so that the rotation of control shaft 64 by simple rotation of hand wheel 66 is limited to positions in which elements of the apparatus other than the auxiliary driving means are controlled for proper operation of the apparatus. In order to actuate the auxiliary driving means, however, it is merely necessary to slide hand wheel 66 along shaft 64 against spring 110 until pin 112 is free of abutment 116. After such shifting of the hand wheel, simple counterclockwise rotation thereof beyond abutment 116 results in movement of the auxiliary driving means to operative position.

The actuation of the braking means, and of other functional elements hereinafter to be described, may be controlled automatically after actuation of the main driving means by means of the following control mechanisms: As shown in Figure 4, a torsional control spring surrounds the shaft 64 and is fastened at one end to a bridge member 122 that is mounted across a housing 124 enclosing the control shaft and the control cams thereon. The other end of the control spring is fastened to a locking cam 126 which is free to rotate relative to the control shaft, but is limited in its counterclockwise rotation by means of a lug 128 on cam 126 and an abutment 130 on the housing 124. A control cam 132 is keyed to shaft 64 adjacent cam 126 and carries an axially projecting pin 134 which cooperates with a ledge 136 on the adjacent side of cam 126. The cam 132 also may serve as a timer control cam, and for this purpose it comprises a high point 138 which is arranged to actuate a timer for timing and automatically controlling operations of the centrifugal apparatus after the main driving means has been moved to fully operative position. When the control shaft is turned clockwise to move the main driving means to fully operative position, the cam 132 is moved to the position illustrated in Figure 11, and the pin 134 on this cam moves the locking cam 126 to the position illustrated in Figure 10 by virtue of the engagement of pin 134 against ledge 136. When the locking cam reaches the position shown in Figure 10, it is releasably locked in such position against the torsion of spring 120 by means of a pawl 140 which is keyed to a hollow shaft 142 extending lengthwise of the control housing 124 and which includes a noze 144 engaging over a shoulder 146 on the locking cam 126. A spring 148 is provided to ensure engagement of the pawl 140 with shoulder 146. When the parts are so engaged the spring 120 is locked under tension, the main driving means is operative, the braking means is inoperative, and the timer cam 132 is in an operative position. At the same time, the control shaft and the control cams thereon are free to move to any of their several positions independently of the control spring, so that automatic operation of the controls for the main driving means and the brake may be instantly substituted for manual operation by turning the hand wheel 66.

In the normal operation of the apparatus, however, the actuation of the principal functional elements thereof is effected automatically and under timed control by means of a timer mechanism, such as illustrated in Figures 4 and 15 to 18, inclusive. This timer mechanism comprises a timer head 150 carried on a timer shaft 152 and including a plurality of timer discs 154. A worm gear 156 moves freely on shaft 152 and cooperates with a constantly revolving worm 158. A clutch element 160 is slidably keyed to shaft 152 for movement into and out of engagement with another clutch element 162 secured to the worm gear 156. A torsion and tension spring 164 is fastened at one end adjacent the timer housing 166 and at its other end to structure connected with clutch element 160. Spring 164 normally acts both to hold clutch element 160 out of engagement with clutch element 162 and to hold the timer shaft 162 and timer head 150 in a zero or starting position. Mechanism cooperating with the timer cam 132 is provided for actuating the timer to place operations of the apparatus under timed control. This mechanism comprises a knee lever 168 which is fulcrumed as at 170. Lever 168 carries a fork at one end for shifting clutch element 160 into engagement with clutch element 162. On its other end it carries a cam button 172 cooperating with the timer control cam 132. Button 172 is yieldably mounted on the lower arm of the knee lever by means of a spring 174. From the foregoing, it should be apparent that when the high point of the timer cam 132 is in engagement with abutment 170 the latter is pushed upwardly and knee lever 168 is rocked to a position engaging clutch element 160 with clutch element 162. Such engagement, of course, results in immediate slow rotation of the timer by worm 158. If for any reason teeth of the clutch elements should contact at their points, the spring 172 is compressed until such time as the teeth engage smoothly. In this way, all danger of straining the timer mechanism is avoided.

In the case of centrifugal apparatus equipped with the most efficient means for treating materials such as sugar massecuites, the timer may be arranged in combination with mechanism for actuating several functional units of the apparatus. A sprayer 180 may be provided for directing a spray of washing fluid into the material in the centrifugal basket 10. A syrup separator 182 may be provided around the lower portion of the curb 14 (Figure 1) for separating syrups flowing from the curb wall into different portions to be collected in separate troughs A and B. A spray pipe 184 may be arranged around the upper portion of the curb wall for flushing molasses or other materials from the curb wall. Provision is made for automatically shutting off the transmission of power to the main driving means, and for automatically applying the brake, in each centrifuging cycle. The operation of all these units may be controlled and timed by means of discs 154 on the timer head 150, said discs being mounted for independent adjustment relative to each other and relative to the timer head by means individual to each disc, including a pinion 190 mounted for rotation on a shaft 192 upon freeing a shaft-locking member 194 from locked position by pushing the locking member inwardly with respect to the timer head against a spring 196. Each timer disc 154 carries a finger or detent 155 for moving parts of the particular actuating mechanism that is under the control of the particular timer disc.

The sprayer 180 may be maintained under very sensitive control, permitting the selection of a spraying period as short as one or two seconds, by employing fluid-controlled means for supplying fluid to the sprayer, and the same is true with respect to the jet pipe 184 for flushing the curb wall. Washing fluid for the sprayer and jet pipe may be supplied through a double valve device 200 mounted on the curb wall, there being an individual valve for each of these units, as illustrated in Figure 20. For example, fluid entering device 200 at 201 for delivery to the sprayer 180 is normally blocked off by a valve 202. The latter, however, is arranged to open in response to fluid pressure in a chamber 204, with which communicates a fluid duct 206 extending from a quickly actuated valve device 208 adjacent the timer head. The valve device 208 in the illustrated construction includes a pair of valve chambers 210 and 210a, valves 212 and 212a and valve stems 214 and 214a.

Part 212 serves to admit fluid from a pressure source 216 into chamber 210 when an extension 218 of the stem 214 is pressed downwardly by means responsive to movement of a "spray-on" control disc of the timer head 150. Chamber 210 connects with duct 206 and thus supplies pressure to actuate valve 202 for the sprayer. Similarly, means responsive to movement of the curb-flushing control disc on the timer head presses valve stem 214a and valve 212a downwardly, admits fluid pressure to chamber 210a, and thence to valve chamber 204a, and thus actuates valve 202a for the curb wash pipe. It will be understood, of course, that valve means for supplying fluid to the sprayer and curb flushing pipe may be actuated directly by the timer, and also that simultaneous fluid-controlled actuation may be obtained by using a single valve system wherever it is not important to be able to actuate the sprayer and curb flushing pipe at different time intervals. Different sources of fluid can be used for the spray and for the curb flushing pipe by providing two fluid inlets 201 and 201a (Figure 20) and by blocking the opening which connects the chambers in which valves 202a and 202 are located, as indicated by the broken hatching in Figure 20.

The timer-actuated means for the control valves at 208 are illustrated in Figures 1, 5, 15, 16 and 18. For example, the valve stem extension 218a is operated by a pin 220a on a lever 222a, which is connected to a rod 224a having an offset shoulder 226a for engaging flat spot 228a on a shaft 230a. A dog 232a oscillates on a pin 234a secured to the upper end of rod 224a. A second dog 236a is mounted on shaft 230a. During counterclockwise rotation of the timer (Figure 16) the timer finger or detent 155 on one of the discs 154 contacts the dog 232a and lifts rod 224a until shoulder 226a snaps over the flat spot 228a. This movement opens the control valve 212a for the curb flushing pipe and causes the pipe to be supplied with fluid through fluid-controlled valve 202a.

For closing the control valve 212a, a finger or detent 165 on another disc 154 engages and moves dog 236a, which, through an adjustable pin 237a, disengages rod 224a from shaft 230a. A spring 238a pulls rod 224a down to its original position and in that way closes the control valve. The operation of the control valves for the sprayer, in the illustrated form, is the same as in the case just described, although different timer discs are involved.

Hand rods 240 and 240a on the ends of levers 222 and 222a are provided to permit manual operation of the control valves at will.

In the illustrated arrangement (Figures 15, 17 and 18), the timer control discs cooperating with the several actuating mechanism controlled by the timer 150 are designated as follows:

154(1)—Sprayer off
154(2)—Sprayer on
154(3)—Curb flushing off
154(4)—Curb flushing on
154(5)—Power off and brake on
154(6)—Syrup separator The operations caused by the first four discs, when using separately controlled valves for the sprayer and the curb flushing pipe, have just been described.

The timer disc 154(5) controlling the actuation of the power-off and brake-on mechanisms, acts through a finger or detent 155 which is arranged to move into contact with a lever 242 secured to hollow shaft 142 (see Figures 4, 5 and 10). Rotation of lever 242 and shaft 142 by the control finger releases pawl 140 from ledge 146 (Figure 10), thus freeing the control spring 120 and causing it to move pin 134, cam 132 and control shaft 64 to a machine-stopping position in which the main driving means is inoperative and the brake is operative. Lever 242 may be operated manually by means of an extended handle 243.

The illustrative actuating mechanism for the syrup separator will now be described. As shown in Figure 1, the separator may conveniently be an annular ring 182 movable into and out of engagement with an annular ledge 183 to divert liquid flowing from the curb wall into a collecting trough A or to permit it to flow into a separate trough B. Lifters such as shown at 250 (Figure 1), connected with an oscillatory yoke 252, may be provided for raising and lowering the annular ring 182. A connecting rod 254 is secured at one end to yoke 252 and at its other end to a lifting arm 256 freely mounted on a hub 258 on the rear end of casing 124 (see Figures 4 and 6). When rod 254 is down, the ring valve 182 is raised to admit liquid into trough B; when rod 254 is up, the ring valve rests on ledge 183 and diverts liquid from the curb wall into trough A.

Normally, the rod 254 and arm 256 are held up by a pawl 258 which engages over a shoulder 260 on arm 256. Pawl 258 is secured to a shaft 262 that extends inside hollow shaft 142 and to a point adjacent the forward end of casing 124. At this point, shaft 262 carries a radial arm 264 (Figure 5) cooperating with a finger or detent 155 on timer control disc 154(6), so that rotation of disc 154(6) by the timer shaft ultimately causes the finger thereon to rock arm 264 and shaft 262, frees pawl 258 from shoulder 260, and frees the lifting arm 256. This permits rod 245 and yoke 252 to drop, which actuates the syrup separator. Arm 264 may be actuated manually by means of an extended lever 265.

The re-setting of the syrup separator is accomplished by means of a collar 266 which is keyed to control shaft 64 and has a peripheral notch 268. Arm 256 carries a pawl 270 on a pivot 272. A spring 274 urges the noze 276 of pawl 270 toward collar 266. When the rod 254 and arm 256 are down and shaft 64 is turned, the noze 276 of pawl 270 engages over notch 268, so that subsequent clockwise movement of the control shaft rotates arm 256 and lifts the rod 254 to reset the syrup separator. Near the end of this rotation pawl 258 re-engages shoulder 260 and locks the parts in their reset position. Upon slight additional rotation, a stop 278 engaging the tail 280 of pawl 270 causes the noze 276 to move off notch 268, so that the control shaft becomes free to move independently of the syrup separator actuating mechanism.

It has been mentioned hereinabove that the control shaft 64 and the control cams thereon are enclosed within a housing 124. This housing communicates with a housing 300 (Figures 2 and 3) which encloses the actuating mechanisms for the main driving means and the auxiliary driving means, and extends upwardly to a point surrounding an outboard bearing for the line shaft 50. In this way, practically all of the moving parts of the control apparatus are enclosed and protected, which not only safeguards their operation but also greatly improves the organization and appearance of the entire machine. With this arrangement of control housings, the lubrication of the moving parts is effected by a single lubricating system. For example, an oil nozzle 302 projects into housing 300 adjacent the top thereof and is supplied with oil under pressure from a communicating supply pipe. This oil is sprayed through nozzle 302 onto gears 88, 90, 92 and 94, the bearings, and on to all other moving parts of the actuating mechanisms for the main driving means and the auxiliary driving means. From the upper part of housing 302 the oil flows downwardly into housing 124 where it is maintained at a substantially constant level, such that all of the control cams on shaft 64 are constantly lubricated, by means of an overflow pipe 304.

It will be understood that the control spring 120 is constructed to impart a strong torsion to the locking cam 126 and to the control shaft 64 when the former is released, in order to ensure proper release of the main driving means and actuation of the brake when cam 126 is released from locked position. In order to retain this strong action of the control spring and at the same time to protect the apparatus against shocks caused by unimpeded movement of the parts in response thereto, I provide dampening means in combination with the other elements of the apparatus, as illustrated, for example in Figure 13. I have also arranged the dampening means in combination with the timing means so that the former serves as a means for lubricating the latter.

At a suitable point, the control shaft 64 has keyed thereto a dampening cam 310 (Figures 4 and 13). This cam cooperates with a spring-pressed plunger 312 which is movable against the compression of spring 314 into a compartment 316 protruding from the housing 124. Passages 318 and a valve 320 are provided in cooperation with plunger 312 so that oil from the lower part of housing 124 flows into the chamber 316 when the plunger 312 moves out of the chamber in contact with the low part of cam 310. A restricted liquid outlet 322 communicates with chamber 316 at one end and at the other end with a duct 324 leading into the timer housing 166. When the control spring 120 is locked under strong tension, the dampening cam 310 rests in the position illustrated in Figure 13. When the locking cam 126 is released by the timer to release the control spring and the control shaft is turned in a counterclockwise direction under the influence of spring 120, the surface of cam 310 presses plunger 312 into chamber 316. This movement of the plunger is resisted by the oil in the chamber, so that abrupt movement of the control parts in response to spring 120 is prevented and shocks on the parts are consequently avoided. As plunger 312 moves into chamber 316 the passages 318 are closed by valve 320 and the oil in the chamber is forced out through the restricted passage 322 and then injected under pressure into timer housing from duct 324. This operation results in complete lubrication of the moving parts of the timing means in each cycle of operation of the centrifugal.

The control apparatus herein disclosed may also comprise an improved arrangement of automatic means for controlling the admission of cooling fluid to the brake drum 18 in order to keep the brake at a low temperature and prevent overheating when operating the centrifugal apparatus on short cycles with quick braking from top speeds to low speeds. A conduit 330 may be provided for admitting cooling fluid to the brake drum 18 (Figure 1), and conduit 330 communicates with a supply pipe 332 through a valve 334. This valve is normally held against its seat by a compression spring 336 and by the pressure of the fluid in supply conduit 332. Its stem 338 extends through a seal 340 and carries on its inner end a cam button 342 riding on the surface of the cooling control cam 344. The cam 344 is keyed to control shaft 64, and its surface is formed so as to open valve 334 and admit cooling liquid to the brake at the desired times during the operation of the centrifugal. As illustrated the cam surface comprises a single high point which is positioned to open valve 334 only when the main driving means is in fully operative position to drive the centrifugal at high speed. Thus the brake drum 18 is cooled during the purging stage of the centrifuging cycle, and the flow of liquid thereto is automatically terminated after the purging stage in order to prevent overflow of liquid from the brake drum.

Referring again to Figures 14 and 19 of the drawings, it will be noted that the brake control cam 72 (cam b of Figure 19) is formed with a plurality of recesses which receive the cam roller 76 on plunger 74. By means of this construction, the brake control cam 72 serves as a holding means for retaining the control apparatus in any selected position. The pressure of roller 76 into each recess on the surface of cam 72 is sufficient to restrain the turning motion of the control shaft 64 except when positive force is applied thereto either by manual actuation of the handle 66 or by releasing spring 120 from its locked position.

The operation of the control apparatus disclosed herein and the relationships of the various control cams in each position of the control apparatus may be gathered from Figure 19 of the drawings. In this figure the horizontal row of diagrams, I, shows the positions of principal parts of the control apparatus when the machine is in a neutral position, that is a position in which neither the brake nor any of the other functional elements of the machine is in operating position. Row II indicates the positions of the same parts when temporarily set for loading the centrifugal basket. Row III represents their positions when the main driving means is in fully operative position to drive the machine at high speed. Row IV shows the relationship of the parts when the brake is applied to stop the machine and row V shows their relationship when the auxiliary driving means is operative and the machine is revolving at a low speed for the discharging operation.

The vertical columns in Figure 19 have reference to the following parts:

Column a, the hand wheel 66;
Column b, the brake control cam 72;
Column c, the dampening control cam 310;
Column d, the cooling control cam 344;
Column e, the timer control cam 132;
Column f, the locking cam 126;
Column g, the control cam 68 for the main driving means, and
Column h, the control cam 106 for the auxiliary driving means.

When the parts are in their neutral position the hand wheel is turned 60 degrees clockwise for the stop position, the brake bands are held away from the brake drum by cam b, the valve controlling the supply of cooling fluid is closed, the timer is inactive, the control spring is released and both the main driving means and the auxiliary driving means are in their inoperative positions. When the hand wheel is turned an additional 60 degrees to the position shown in row II, the dampening plunger 312 moves upwardly in contact with the low part of cam 310 and the actuating mechanism for the main driving means moves to an operative position, but all of the other elements remain in the same condition of actuation as before. This particular control position may be utilized for loading the centrifugal basket without affecting the timer or the cooling water controls, and the main driving means may be engaged or disengaged at will in order to vary the speed of the centrifugal for the charging operation. After the machine has been charged the hand wheel may be turned an additional 25 degrees to the position shown in row III. Here the brake is off, the dampening plunger is out of its chamber, the cooling water valve is open, the timer is actuated, the control spring is locked under tension by locking cam 126, the main driving means is operative and the auxiliary driving means remains inoperative.

After a running period determined by the timing mechanism, or at any time when desired by the operator, the locking cam 128 is released from pawl 144 and the parts are moved clockwise to the position shown in IV. Here the brake is applied, the dampening plunger is pressed into its chamber, the cooling water valve is closed, the timer is inactive and both driving means are inactive. The machine comes to rest under the influence of the brake and is then ready for the discharging operation.

Thereupon, the hand wheel may be moved axially and disengaged from abutment 116, after which it is turned 60 degrees in a counterclockwise direction to release the brake and move the auxiliary driving means to an operative position, while at the same time keeping the main driving means, the timer and the water cooling valve in their inoperative positions. This occurs without affecting the locking cam 126, and therefore independently of the control spring 120. Upon completion of the discharging operation, the hand wheel is again moved clockwise to either the stop or the neutral position, or it may be moved even farther to the charging position to begin a new cycle of operation. The positions shown in rows I and II are not stable positions unless the hand wheel has previously been turned to place cam 126 (f) in a position locking the control spring, as shown in row III.

It will be understood that I have illustrated and described a construction of apparatus which is but one of the many forms in which my invention may be embodied. In this construction I have included numerous arrangements and functional elements which may not be of utility in certain uses of the apparatus, but which nevertheless possess important advantages in combination with the other elements for some special purposes. I realize that many features of this disclosure may be omitted and that all of the parts of the illustrative embodiment may be modified while still retaining the advantages and features of my invention, and I therefore desire that the appended claims be accorded a scope commensurate with the full contribution of the invention without restriction to non-essential features of the illustrated embodiment.

I claim:

1. Centrifugal apparatus comprising a centrifugal basket and driving means therefor, a brake for retarding revolution of the basket, actuating mechanisms for said brake and driving means, respectively, a common control shaft for said actuating mechanisms, each of said actuating mechanisms including a movable element adjacent but not secured to said control shaft and means for urging said element in one direction with respect to said control shaft, and control cams carried by said shaft for moving the respective elements in another direction.

2. Centrifugal apparatus comprising a centrifugal basket and driving means therefor, a curb surrounding the basket, a brake for retarding revolution of the basket, a sprayer for directing washing fluid into the basket, a syrup separator for separating liquids flowing from the curb, actuating mechanisms for said brake, driving means, sprayer and syrup separator, respectively, timing means set in operation upon actuation of said driving means for governing the time for actuation of the sprayer, syrup separator and brake in each centrifuging cycle, actuating mechanism for said timing means, and a common control shaft for said actuating mechanism, each of said actuating mechanisms including means for urging the same in one direction with respect to said control shaft and control means carried by said shaft for moving each of said actuating mechanisms in another direction.

3. In combination with centrifugal apparatus including a centrifugal basket, driving means therefor, a brake for retarding revolution of the basket, a curb surrounding the basket, and a sprayer for directing washing fluid into the basket, mechanical actuating mechanisms for said driving means, brake and sprayer, timing means set in operation upon actuation of the driving means to govern the time of actuations of said sprayer and brake, mechanical actuating mechanism for said timing means, and control means comprising a control shaft and a plurality of control cams thereon cooperating respectively with the actuating mechanisms for said driving means, brake and timing means to govern the conditions of actuation thereof.

4. In combination with centrifugal apparatus including a centrifugal basket, driving means therefor, a brake for retarding revolution of the basket, a curb surrounding the basket, a sprayer for directing washing fluid into the basket, and a syrup separator for separating liquids flowing from the curb, mechanical actuating mechanisms for said driving means, brake, sprayer and syrup separator, timing means cooperating with the actuating mechanisms for said brake, sprayer and syrup separator to govern the time of actuation thereof, mechanical actuating mechanism for said timing means, and control means comprising a control shaft and a plurality of control cams on said shaft controlling positions of the actuating mechanisms for said driving means, brake and timing means, respectively.

5. In combination with centrifugal apparatus including a centrifugal basket, main driving means therefor, a brake for retarding revolution of the basket, a curb surrounding the basket, a sprayer for directing washing fluid into the basket, a syrup separator for separating liquids flowing from the curb, and auxiliary driving means for driving the basket at low speed, mechanical actuating mechanisms for said main driving means, auxiliary driving means, brake, sprayer and syrup separator, timing means cooperating with the actuating mechanisms for said sprayer, syrup separator and brakes and operative upon actuation of said main driving means to govern the time of actuation of said sprayer, syrup separator and brake, and control means comprising a common control shaft and a plurality of control cams on said shaft respectively cooperating with the actuating mechanisms for said main driving means, auxiliary driving means, brake and timing means to govern the conditions of actuation thereof.

6. In apparatus as claimed in claim 5, a casing enclosing said control shaft, and means for maintaining liquid lubricant in said casing at a level above the bottoms of said cams.

7. In combination with centrifugal apparatus including a suspended basket, drying means therefor, a brake, a sprayer and a syrup separator, mechanical actuating mechanisms for actuating said elements including means for energizing said driving means and automatic timing means operative to actuate said sprayer, syrup separator and brake at predetermined and variable intervals after the driving means have been energized, mechanical actuating mechanism for said timing means, and mechanical control means comprising a common control shaft, a plurality of control cams on said shaft cooperating with the actuating mechanisms for said driving means, brake and timing means, respectively, to control the conditions of actuation thereof, a control spring for urging said shaft to a position in which said driving means is inoperative and said brake is operative and means releasable by said timing means for locking said spring under tension upon actuation of said driving means.

8. In combination with centrifugal apparatus including a suspended basket, driving means therefor, a brake, a sprayer and a syrup separator, mechanical actuating mechanisms for actuating said driving means, brake, sprayer and syrup separator including means for energizing said driving means and automatic timing means operative to actuate said sprayer, syrup separator and brake at predetermined and variable intervals after the driving means has been energized, mechanical actuating mechanism for said timing means, and control means comprising a common control shaft, a plurality of control cams on said shaft cooperating with the actuating mechanisms for said driving means, brake and timing means, respectively, to control the conditions of actuation thereof, a control spring normally urging said shaft to a position in which the actuating mechanism for said driving means contacts a high part of the corresponding cam to render the driving means inoperative and in which the actuating mechanism for said brake contacts a lower part of the corresponding cam to render said brake operative, means releasable by said timing means for locking said spring under tension upon turning of said shaft to actuate said driving means, and means operative when said locking means is released for retarding movement of said shaft under the influence of said spring.

9. In apparatus as claimed in claim 8, a casing enclosing said control shaft and means for maintaining liquid lubricant in said casing at a level above the bottoms of said cams, said movement retarding means comprising a cylinder communicating with a lower portion of said casing to receive liquid therefrom when said control shaft is in centrifugal-driving position and a piston movable into said cylinder in response to movement of said shaft under the influence of said control spring.

10. In combination with centrifugal apparatus including a suspended basket, main driving means therefor, auxiliary driving means therefor, a brake, a sprayer and a syrup separator, mechanical actuating mechanisms for actuating said elements including means for energizing said main and auxiliary driving means and automatic timing means operative to actuate said sprayer, syrup separator and brake at predetermined and variable intervals after the main driving means has been energized, mechanical actuating mechanism for said timing means, and common control means cooperating with said actuating mechanisms for controlling the conditions of actuation of said main driving means, auxiliary driving means, brake and timing means, said control means comprising a common control shaft, a plurality of control cams on said shaft controlling positions of the actuating mechanisms for said main driving means, auxiliary driving means, brake and timing means, respectively, a control spring normally urging said shaft to a position in which said driving means are inoperative and said brake is operative, and means releasable by said timing means for locking said spring under tension upon actuation of said main driving means.

11. In combination with centrifugal apparatus including a suspended basket, main driving means therefor, auxiliary driving means therefor, a brake, a sprayer and a group separator, mechanical actuating mechanisms for actuating said elements including means for energizing said main and auxiliary driving means and automatic timing means operative to actuate said sprayer, syrup separator and brake at predetermined and variable intervals after the main driving means has been energized, mechanical actuating mechanism for said timing means, and control means cooperating with said actuating mechanisms for controlling the conditions of actuation of said main driving means, auxiliary driving means, brake and timing means, said control means comprising a common control shaft, a plurality of control cams on said shaft cooperating with the actuating mechanisms for said main driving means, auxiliary driving means, brake and timing means, respectively, a control spring normally urging said shaft to a position in which said driving means are inoperative and said brake is operative, means releasable by said timing means for locking said spring under tension upon actuation of said main driving means and for releasing said spring to return said shaft to brake actuating position when actuated by said timing means, a stop limiting movement of said shaft beyond brake actuating position under the influence of said spring, and means for freeing said shaft from said stop to permit turning of the shaft beyond brake actuating position into a position actuating said auxiliary driving means.

12. In combination with centrifugal apparatus comprising a basket suspended on a gyratory spindle, a rotatable shaft and driving means for the basket including a friction drum and retractible clutching members carried by said shaft to engage the drum by centrifugal force when the shaft is rotated, means for moving said members to and from driving position comprising a lever fulcrumed intermediate its ends, means normally urging said lever toward driving position, and a control shaft having a control cam thereon cooperating with said lever for moving the lever away from driving position.

13. In combination with centrifugal apparatus comprising a basket suspended on a gyratory spindle, a rotatable shaft, main driving means for the basket including a friction drum and retractible clutching members carried by said shaft to engage the drum by centrifugal force when the shaft is rotated, and auxiliary driving means including means for coupling said shaft with said drum to drive the basket at reduced speed, means comprising a lever fulcrumed intermediate its ends for moving said clutching members to and from driving position, means comprising another lever fulcrumed intermediate its ends for moving said coupling means to and from driving position, means normally urging said first-mentioned lever toward driving position, means normally urging said other lever away from driving position, a control shaft, and control cams on said control shaft, one for each of said levers, cooperating with the respective levers for moving the same away from and toward their driving positions in proper coordination with each other.

14. In combination with centrifugal apparatus including a suspended basket, main driving means for revolving the basket at high speed and auxiliary driving means for revolving the basket at reduced speed, a turnable control shaft, mechanical actuating mechanisms for said main driving means and said auxiliary driving means, respectively, cam means on said shaft operative in one field of turning movement thereof to hold the actuating mechanisms for said main driving means in driving position, and separate cam means on said shaft operative in a different field of turning movement thereof to hold the actuating mechanism for said auxiliary driving means in driving position.

15. In combination with centrifugal apparatus including a suspended basket, main driving means for revolving the basket at high speed and auxiliary driving means for revolving the basket at reduced speed, a rotatable control shaft, mechanical actuating mechanisms for said main driving means and said auxiliary driving means, respectively, cam means connected with said control shaft and operative in one field of rotation thereof to hold the actuating mechanism for said main driving means in driving position, and cam means connected with said control shaft and operative in a different field of rotation thereof to hold the actuating mechanism for said auxiliary driving means in driving position.

16. Centrifugal apparatus comprising, in combination a suspended basket, driving means therefor, braking means, timing means for governing the time of actuation of the braking means in each centrifuging cycle, actuating mechanisms for said driving means, breaking means and timing means, respectively, means controlling the condition of actuation of said driving, braking and timing means comprising a control shaft and a plurality of control cams on said shaft cooperating, respectively, with the actuating mechanisms for said driving, braking and timing means, said timing means comprising a timer shaft extending substantially parallel to said control shaft and carrying at its forward end a timer head including adjustably related timer discs, and said actuating mechanism for the timing means comprising a member cooperating with the respective control cam and means operative to establish rotation of said timer shaft upon movement of said member to a predetermined position by said control cam.

17. In combination with centrifugal apparatus comprising a basket suspended on a gyratory spindle, a rotatable shaft and main driving means including a clutch drum connected with said spindle for transmitting power from said shaft to said spindle to revolve the latter at high speed, auxiliary driving means for connecting said shaft with said drum to revolve the spindle at reduced speed, said auxiliary driving means comprising a clutch element connected by gearing with said shaft to rotate constantly at reduced speed, a ring gear on said drum, a pinion for driving said ring gear, another clutch element connected with said pinion and adapted to cooperate with the aforesaid clutch element, and shiftable means for moving both said other clutch element and said pinion into their operative positions, actuating mechanism including a fulcrumed lever for moving said shiftable means to and from operative position, spring means normally holding the same away from operative position, and control means including a control shaft and a control cam thereon cooperating with said lever for moving said shiftable means to operative position.

18. In combination with centrifugal apparatus comprising a basket suspended on a gyratory spindle, a rotatable shaft and main driving means including a clutch drum connected with said spindle for transmitting power from said shaft to said spindle to revolve the latter at high speed, auxiliary driving means for connecting said shaft with said drum to revolve the spindle at reduced speed, said auxiliary driving means comprising a clutch element connected by gear with said shaft to rotate constantly at reduced speed, a ring gear on said drum, a pinion for driving said ring gear, another clutch element connected with said pinion and adapted to cooperate with the aforesaid clutch element, and shiftable means for moving both said other clutch element and said pinion into their operative positions, actuating mechanism including a fulcrumed lever for moving said shiftable means to and from operative position, spring means normally holding the same away from operative position, and control means including a control shaft and a control cam thereon cooperating with said lever for moving said shiftable means to operative position, said lever comprising a yieldable portion cooperating with said control cam whereby yieldably to press said pinion toward said ring gear when the cam is moved to operative position.

19. In combination with centrifugal apparatus comprising a basket suspended on a gyratory spindle, a rotatable shaft, main driving means for the basket including a friction drum and retractible clutching members carried by said shaft to engage the drum by centrifugal force when the shaft is rotated, and auxiliary driving means including means for coupling said shaft with said drum to drive the basket at reduced speed, means comprising a lever fulcrumed intermediate its ends for moving said clutching members to and from driving position, means comprising another lever fulcrumed intermediate its ends for moving said coupling means to and from driving position, means normally urging said first-mentioned lever toward driving position, means normally urging said other lever away from driving position, a control shaft, control cams on said control shaft, one for each of said levers, cooperating with the respective levers for moving the same way from and toward their driving positions in proper coordination with each other, said levers extending substantially vertically below said shaft, said control shaft extending forwardly from the lower portions of said levers to a position convenient to an attendant of the apparatus, a casing enclosing said control shaft, and a casing enclosing said levers and communicating with the aforesaid casing.

JOSEPH HERTRICH.

CERTIFICATE OF CORRECTION.

Patent No. 2,261,914. November 4, 1941.

JOSEPH HERTRICH.

It is hereby certified that error appears in the printed specification of the above numbered patent requiring correction as follows: Page 3, first column, lines 1 and 2, strike out the words "and an outer surface 42 for cooperation with friction clutch pads 44"; and second column, line 52, for the word "cooperative" read --cooperating--; page 4, first column, line 45, for "When" read --With--; page 6, first column, line 20, for "rod 245" read --rod 254--; page 8, first column, line 72, claim 7, for "drying" read --driving--; page 9, first column, line 14, claim 11, for "group" read --syrup--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.